US006475945B1

(12) United States Patent
Carnahan et al.

(10) Patent No.: US 6,475,945 B1
(45) Date of Patent: Nov. 5, 2002

(54) FUNCTIONALIZED CATALYST SUPPORTS AND SUPPORTED CATALYST SYSTEMS

(75) Inventors: Edmund M. Carnahan, Fresno; Grant B. Jacobsen, Houston, both of TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/554,805

(22) PCT Filed: Sep. 16, 1999

(86) PCT No.: PCT/US99/21590

§ 371 (c)(1),
(2), (4) Date: May 18, 2000

(87) PCT Pub. No.: WO00/15672

PCT Pub. Date: Mar. 23, 2000

Related U.S. Application Data

(60) Provisional application No. 60/100,488, filed on Sep. 16, 1998.

(51) Int. Cl.[7] .................................................. B01J 29/04
(52) U.S. Cl. .......................... 502/87; 502/80; 502/152; 526/160; 526/943; 526/97
(58) Field of Search ............................ 502/87, 80, 152; 526/160, 943, 97

(56) References Cited

U.S. PATENT DOCUMENTS

| 5,132,380 A | | 7/1992 | Stevens et al. |
|---|---|---|---|
| 5,153,157 A | | 10/1992 | Hlatky et al. |
| 5,189,192 A | | 2/1993 | LaPointe et al. |
| 5,198,401 A | | 3/1993 | Turner et al. |
| 5,350,723 A | | 9/1994 | Neithamer et al. |
| 5,427,991 A | | 6/1995 | Turner |
| 5,453,410 A | | 9/1995 | Kolthammer et al. |
| 5,470,927 A | | 11/1995 | Turner et al. |
| 5,470,993 A | | 11/1995 | Devore et al. |
| 5,527,929 A | | 6/1996 | Timmers et al. |
| 5,556,928 A | | 9/1996 | Devore et al. |
| 5,561,095 A | * | 10/1996 | Chen et al. .................. 502/169 |
| 5,602,269 A | | 2/1997 | Biagini et al. |
| 5,616,664 A | | 4/1997 | Timmers et al. |
| 5,624,878 A | | 4/1997 | Devore et al. |
| 5,626,087 A | | 5/1997 | Lompa |
| 5,643,847 A | * | 7/1997 | Walzer Jr. .................. 502/117 |
| 5,763,547 A | | 6/1998 | Kolthammer et al. |

FOREIGN PATENT DOCUMENTS

| EP | 520732 | 12/1992 |
|---|---|---|
| EP | 824112 A1 | 8/1998 |
| WO | WO 94/07928 | 4/1994 |
| WO | WO 96/23005 | 8/1996 |
| WO | WO 96/28480 | 9/1996 |
| WO | WO 97/43323 | 11/1997 |
| WO | WO 97/44371 | 11/1997 |

OTHER PUBLICATIONS

Reddy et al; Prog. Poly. Sci., 1995, 20, 309–367.
Marks et al, J. Am. Chem. Soc., 118, 12451–12452 (1996).
Chen et al, J. Am. Chem. Soc. 1997, 119, 2582–2583.
Jia et al, Organometallics, 1997, 16, 842–857.
Coles et al, J. Am Chem. Soc., 1997, 119, 8126.
Ewen, Stud. In Surf. Sci. Catal. 1994, 89, 405–410.

* cited by examiner

*Primary Examiner*—David W. Wu
*Assistant Examiner*—Ling-Siu Choi

(57) ABSTRACT

The present invention relates to functionalized catalyst supports that are useful in the formation of supported polymerization catalysts, supported catalysts derived from such functionalized catalyst supports, methods for preparing such functionalized catalyst supports and supported catalysts, and polymerization processes utilizing such supported catalysts. The functionalized catalyst support comprises a particulated support material having chemically bonded thereto a plurality of aluminum-containing groups derived from a nonionic Lewis acid, said aluminum-containing groups: containing at least one fluoro-substituted hydrocarbyl ligand containing from 1 to 20 carbons, said hydrocarbyl ligand being bonded to aluminum, and being bonded to said support material, optionally through a bridging moiety, said composition being capable of activating a Group 3–10 metal complex for the addition polymerization of one or more addition polymerizable monomers.

23 Claims, No Drawings

FUNCTIONALIZED CATALYST SUPPORTS AND SUPPORTED CATALYST SYSTEMS

This application claims the benefit of provisional application 60/100,488 filed Sep. 16, 1998.

The present invention relates to functionalized catalyst supports that are useful in the formation of supported polymerization catalysts. The present invention further relates to supported catalysts obtainable using such functionalized catalyst supports, which supported catalysts are particularly adapted for use in a polymerization process wherein at least one polymerizable olefin monomer is contacted with the supported catalyst under polymerization conditions to form a polymeric product. The present invention further pertains to methods for making such functionalized catalyst supports and supported catalysts. The present invention further pertains to polymerization processes utilizing such supported catalysts.

It is previously known in the art to activate Ziegler-Natta polymerization catalysts, particularly such catalysts comprising Group 3–10 metal complexes containing delocalized π-bonded ligand groups, by the use of an activator. Generally in the absence of such an activator compound, also referred to as a cocatalyst, little or no polymerization activity is observed. A class of suitable activators are aluminoxanes, or alkylaluminoxanes, which are generally believed to be oligomeric or polymeric alkylaluminoxy compounds, including cyclic oligomers. Generally such compounds contain, on average about 1.5 alkyl groups per aluminum atom, and are prepared by reaction of trialkylaluminum compounds or mixtures of compounds with water (Reddy et al, *Prog. Poly. Sci.*, 1995, 20, 309–367). The resulting product is in fact a mixture of various substituted aluminum compounds including especially, trialklyaluminum compounds (resulting from incomplete reaction of the trialkylaluminum starting reagent or decomposition of the alumoxane). The amount of such free trialkylaluminum compound in the mixture generally varies from 1 to 50 percent by weight of the total product. Examples of alumoxanes include methylalumoxane (MAO) made by hydrolysis of trimethylaluminum as well as modified methylalumoxane (MMAO), made by hydrolysis of a mixture of trimethylaluminum and triisobutylaluminum. While such activators normally are soluble in hydrocarbons (homogeneous cocatalyst), supported versions may be prepared by fixing the alumoxane to a solid, particulated substrate. Silica having alumoxane, particularly methylalumoxane, chemically bonded thereto, presumably by reaction to form a silicon/oxygen/aluminum bond, is also well known and commercially available. Disadvantageously, such a heterogeneous, supported cocatalyst does not demonstrate significant cocatalytic efficiency due in part possibly to the oligomeric nature and low Lewis acidity of alumoxane.

A different type of activator compound is a Bronsted acid salt capable of transferring a proton to form a cationic derivative or other catalytically active derivatiive of such a Group 3–10 metal complex. Examples of such Bronsted acid salts are protonated ammonium, sulfonium, or phosphonium salts capable of transferring a hydrogen ion, disclosed in U.S. Pat. Nos. 5,198,401, 5,132,380, 5,470,927, and 5,153,157, as well as oxidizing salts such as lead, silver, carbonium, ferrocenium and silyilium salts, disclosed in U.S. Pat. Nos. 5,350,723, 5,189,192 and 5,626,087. Supported or polyionic salt activators disclosed in U.S. Pat. No. 5,427,991 are prepared by chemically binding a plurality of such salt anions to a core component. Disadvantageously, activation of a neutral metal complex by means of a proton transfer mechanism unavoidably produces a neutral by-product, such as an amine, that can interfere with subsequent catalyst activity.

Further suitable activators for the above metal complexes include strong Lewis acids including (trisperfluorophenyl)borane and tris(perfluorobiphenyl)borane. The former composition has been previously disclosed for the above stated end use in EP-A-520,732, and elsewhere, whereas the latter composition is disclosed in Marks, et al., *J. Am. Chem. Soc.*, 118, 12451–12452 (1996). Additional teachings of the foregoing activators may be found in Chen, et al, *J. Am. Chem. Soc.* 1997, 119, 2582–2583, Jia et al. *Organometallics*, 1997, 16, 842–857. and Coles et al, *J. Am. Chem. Soc.* 1997, 119, 8126–8126. All of the foregoing Lewis acid activators in practice are based on perfluorophenyl substituted boron compounds. Use of such activator compounds in a supported catalyst system has met with limited success due to the difficulty in retaining the activator on the support surface.

In U.S. Pat. No. 5,453,410, an alumoxane, particularly methylalumoxane, was disclosed for use in combination with constrained geometry, Group 4 metal complexes, especially in a molar ratio of metal complex to alumoxane of from 1/1 to 1/50. This combination beneficially resulted in improved polymerization efficiency. Similarly, in U.S. Pat. Nos. 5,527,929, 5,616,664, 5,470,993, 5,556,928, 5,624,878, various combinations of metal complexes with trispentafluorophenyl boron cocatalyst, and optionally an alumoxane, were disclosed for use as catalyst compositions for olefin polymerization.

Despite the satisfactory performance of the foregoing catalyst activators under a variety of polymerization conditions, there is still a need for improved cocatalysts for use in the activation of various metal complexes under a variety of reaction conditions. In particular, it is desirable to remove boron containing contaminating compounds from such activator composition. Such boron containing contaminating compounds result primarily from ligand exchange with the alumoxane, and comprise trialkylboron compounds having from 1 to 4 carbons in each alkyl group, for example, trimethylboron, triisobutylboron, or mixed trialkylboron products. It would be desirable if there were provided compounds that could be employed in solution, slurry, gas phase or high pressure polymerizations and under homogeneous or heterogeneous process conditions having improved activation properties, that lack such trialkylboron species.

It is known that an exchange reaction between aluminum trialkyl compounds and tris(perfluorophenyl)borane occurs under certain conditions. This phenomenon has been previously described in U.S. Pat. No. 5,602,269. Tris (perfluorophenyl)aluminum is a strong Lewis acid as well. However, it generally performs poorly by itself as an activator compared with tris(perfluorophenyl)borane. Similarly, It has further been demonstrated that active catalysts resulting from the use of an aluminate anion based upon tris (perfluorophenyl)aluminum for the activation of ansametallocenes and biscyclopentadienyl derivatives of zirconium(IV) are generally of lower activity than those formed by the corresponding borane (Ewen, *Stud. in Surf. Sci. Catal.* 1994, 89, 405–410). The foregoing tri(fluoroaryl) aluminum compounds are considered to be moderately shock and temperature sensitive and difficult to handle in the pure state. In order to avoid this problem, the compounds may be prepared as adducts with Lewis bases such as ethers. Disadvantageously, however, the presence of an ether detrimentally affects the ability to use the compounds as activators for metal complexes, whereas, removing the ether can result in detonation of the compound.

U.S. Pat. No. 5,763,547 discloses a slurry polymerization process using a supported catalyst formed by slurrying a silica/alumoxane support with a solution of a monocyclopentadienyl Group IV metal complex in ISOPAR E, and subsequently briefly contacting with a borane activator.

WO 97/44371 discloses a gas phase polymerization process using a supported catalyst formed by contacting a dried or calcined silica support (optionally pretreated with water) with triethylaluminum, slurrying the support with toluene and contacting with a solution of a borane, and subsequently contacting with a solution of a monocyclopentadienyl Group IV metal complex in toluene. Representative polymer compositions disclosed demonstrated improved rheological performance, and a rising comonomer distribution.

WO 97/43323 discloses slurry polymerization processes utilizing a supported catalyst formed by depositing am monocyclopentadienyl Group IV metal complex and a perfluorophenyl borate onto a dried and/or calcined silica support which has been passivated with a trialkylaluminum compound. Representative polymer compositions demonstrated a rising comonomer distribution.

EP 824112A1 discloses a supported composition wherein a Group IIIA metal-containing compound is directly (or through a spacer) covalently bonded to a moiety on the support, which compound may be of neutral or ionic construction, and which forms a catalyst system with a transition metal compound, such as a metallocene. Although aluminum-containing compounds are broadly disclosed as suitable Group IIIA metal-containing compounds, no example describes their use; nor do any teachings recognize any unexpected utility of aluminum-containing species.

U.S. Pat. No. 5,643,847 discloses a catalyst composition comprising a metal oxide support having a counter anion derived from a Lewis acid not having readily hydrolyzable ligand (such as a tri-perfluorophenyl borane) covalently bound to the surface of the support directly through the oxygen atom of the metal oxide, wherein the anion is also ionically bound to a catalytically active transition metal compound. Although aluminum-containing Lewis acids are broadly disclosed, no example describes their use; nor do any teachings recognize any unexpected utility of aluminum-containing species.

It would be desirable if there were provided functionalized catalyst supports, more particularly, supported catalyst systems obtainable from the activation of a metal complex using such functionalized catalyst supports, for use in olefin polymerizations that could be employed in slurry, solid phase, gas phase or high pressure polymerizations.

Accordingly, the subject invention provides a functionalized catalyst support comprising a particulated support material having chemically bonded thereto a plurality of aluminum-containing groups derived from a non-ionic Lewis acid, said aluminum-containing groups:

containing at least one fluoro-substituted hydrocarbyl ligand containing from 1 to 20 carbons, said hydrocarbyl ligand being bonded to aluminum, and being bonded to said support material, optionally through a bridging moiety, said composition being capable of activating a Group 3–10 metal complex for the addition polymerization of one or more addition polymerizable monomers.

The subject invention further provides a functionalized catalyst support comprising the reaction product of:

(a) a solid inorganic oxide support material and (b) a mixture in turn derived from the contacting of a non-ionic Lewis acid with one or more trihydrocarbylaluminum, dihydrocarbylaluminumhydrocarbyloxides, or dihydrocarbylaluminum(dihydrocarbyl)amide compounds having up to 20 atoms other than hydrogen in each hydrocarbyl, hydrocarbyloxy or dihydrocarbylamide group, or a mixture thereof to form a non-ionic Lewis acid component.

The subject invention further provides a supported catalyst comprising the functionalized catalyst support according to any of the preceding claims and a Group 3–10 metal complex containing a substituent which reacts with the functionalized catalyst support to thereby form a composition which is catalytically active for the polymerization of olefins.

The subject invention further provides a method for preparing a functionalized catalyst support comprising:

a. slurrying a particulated support in a hydrocarbon or aromatic diluent;

b. adding a compound $AR^f_{z''}Al_2Q^1_{6-z''}$ in in sufficient quantity to fully react with surface groups as defined by titration with $Et_3Al$, to form a treated support, where
$Ar^f$ is a fluorinated aromatic hydrocarbyl moiety of from 6 to 30 carbon atoms;
z" is a number from 0 to 6, and
$Q^1$ independently each occurrence is selected from hydrocarbyl, hydrocarbyloxy, or dihydrocarbylamido, of from 1 to 20 atoms other than hydrogen;

c. washing the treated support with a hydrocarbon or aromatic solvent, and d. optionally drying.

The subject invention further provides a method for preparing a functionalized catalyst support comprising:

a. slurrying an optionally calcined particulated support with an alkyl aluminum reagent provided in sufficient quantity to fully react with surface groups as defined by titration with $Et_3Al$, to form a passivated support, b. adding from 0.1 to 50 mmol $Ar^f_3M$, to form a treated support, where M=aluminum or boron and $Ar^f$ is a fluorinated aromatic hydrocarbyl moiety of from 6 to 30 carbons, c. washing the treated support with a hydrocarbon or aromatic solvent; and d. drying under reduced pressure.

The subject invention further provides a polymerization process comprising contacting one or more addition polymerizable monomers under gas phase or slurry polymerization conditions with a catalyst composition of the invention.

These and other advantages are more fully set forth in the following detailed description.

The functionalized catalyst support of the invention in a preferred embodiment may be depicted as a chemical structure of the following formula:

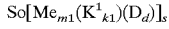

wherein:

So is a particulated solid support material;

Me is aluminum;

m1 is a number from 1–20, preferably from 1 to 3, more preferably 1;

$K^1$ independently each occurrence is a ligand group bonded to Me having from 1 to 30 atoms other than hydrogen, with the proviso that in at least one occurrence, $K^1$ is a fluoro-substituted hydrocarbyl group of from 1 to 20 carbons, preferably a fluoro-substituted aryl group of from 6 to 20 carbons, more preferably a perfluoroaryl group of from 6 to 20 carbons, most preferably pentafluorophenyl; and optionally two or more $K^1$ groups may be bonded together thereby forming a bridging group linking two or more Me atoms or forming a fused ring system;

k1 is a number from 1 to 5 selected to provide charge neutrality to the complex;

D is a bridging moiety chemically bonded to So by means of which the group, $[Me_{m1}(K^1_{k1})(D_d)]$, is attached to the particulated solid support;

d is a positive number from 0 to 5, preferably 1 to 3, more preferably 1, and less than or equal to m, said d equaling the average number of chemical bonds to the substrate per group, $[Me_{m1}(K^1_{k1})(D_d)]$;

s is a number greater than or equal to 2 and is equal to the number of $[Me_{m1}(K^1_{k1})(D_d)]$ groups attached to the substrate, So. Preferably s is chosen to provide a concentration of $[Me_{m1}(K^1_{k1})(D_d)]$ groups on the substrate from $1\times10^{-5}$ mole/gram to 2 mmole/gram, more preferably from 0.1 µmole/gram to 500 µmole/g.

The functionalized catalyst supports of the invention are readily prepared by combining a particulated support material having reactive functional groups on the surface thereof, with a non-ionic Lewis acid source of the aluminum-containing groups that is able to react with the functional surface groups of the support, preferably under conditions to chemically attach the aluminum of the $[Me_m(K^1_{k1})(D_d)]$ group and the support by means of the linking group D, optionally followed by removing byproducts formed by the reaction. Preferred supports and sources of aluminum groups are those capable of reacting by means of a ligand exchange to release a volatile hydrocarbon or substituted hydrocarbon by-product that is readily removed from the reaction environment.

Preferred sources of the ligand groups, $[Me_m(K^1_{k1})(D_d)]$, are non-ionic Lewis acids of the formula $[Me_m(K^1)(K^1_{k1})]$, especially, tri(fluoroaryl)aluminum compounds, most preferably tris(pentafluorophenyl)aluminum, as well as mixtures or adducts of such tri(fluoroaryl)aluminum compounds with one or more trialkylaluminum, alkylaluminumoxy, fluoraryluminoxy, or tri(fluoroaryl)boron compounds containing from 1 to 20 carbons in each alkyl group and from 6 to 20 carbons in each fluoroaryl ligand group. Such reactants are capable of reacting with a reactive functionality of the support to covalently bond thereto, thereby generating the linking group, D, in the process. Preferred reactants are those capable of bonding to a hydroxyl, hydrocarbyloxy, hydrocarbylmetal or hydrocarbylmetalloid functionality of the substrate, preferably by a ligand exchange mechanism, thereby generating an oxy, metal of metalloid containing linking group, D. It should be understood that the linking group, D, may be a component of either the substrate or the non-ionic Lewis acid used to generate the present compositions, or constitute a remnant resulting from the reaction of such components. Preferably, D will be an oxygen-containing bridging moiety, more preferably the oxygen contributed by the hydroxyl group of an optionally but preferably dried silica support.

Examples of the foregoing mixtures or adducts of non-ionic, Lewis acids for use in the preparation of the functionalized supports of the invention include compositions corresponding to the formula:

$$[(-AlQ^1-O-)_z(-AlAr^f-O-)_{z'}](Ar^f_{z''}Al_2Q^1_{6-z''})$$

where;

$Q^1$ independently each occurrence is selected from hydrocarbyl, hydrocarbyloxy, or dihydrocarbylamido, of from 1 to 20 atoms other than hydrogen;

$AR^f$ is a fluorinated aromatic hydrocarbyl moiety of from 6 to 30 carbon atoms;

z is a number from 1 to 50, preferably from 1.5 to 40, more preferably from 2 to 30, and the moiety $(-AlQ^1-O-)$ is a cyclic or linear oligomer with a repeat unit of 2–30;

z' is a number from 1 to 50, preferably from 1.5 to 40, more preferably from 2 to 30, and the moiety $(-AlAr^f-O-)$ is a cyclic or linear oligomer with a repeat unit of 2–30; and z" is a number from 0 to 6, and the moiety $(Ar^f_{z''}Al_2Q^1_{6-z''})$ is either tri(fluoroarylaluminum), trialkylaluminum, a dialkylaluminumalkoxide, a dialkylaluminum(dialkylamide) or an adduct of tri (fluoroarylaluminum) with a sub-stoichiometric to super-stoichiometric amount of a trialkylaluminum.

The moieties $(Ar^f_{z''}Al_2Q^1_{6-z''})$ may exist as discrete entities or dynamic exchange products. That is, such moieties may be in the form of dimeric or other multiple centered products in combination with metal complexes and other organometallic compounds, including those resulting from partial or complete ligand exchange during the process used for their manufacture. Such more complex mixture of compounds may result from a combination of the foregoing compounds, which are Lewis acid adducts, with other compounds such as metallocenes or alumoxanes. Such exchange products may be fluxional in nature, the concentration thereof being dependant on time, temperature, solution concentration and the presence of other species able to stabilize the compounds, thereby preventing or slowing further ligand exchange. Preferably z" is from 1–5, more preferably from 1–3.

The foregoing class of non-ionic Lewis acids are also suitable for use in the present invention in the absence of aluminumoxy species. Such compounds accordingly are adducts corresponding to the formula:

where $Ar^f$, $Q^1$ and z are as previously defined.

Preferred non-ionic Lewis acids for use herein are those of the foregoing formula wherein:

$Q^1$ independently each occurrence is selected from $C_{1-20}$ alkyl;

$Ar^f$ is a fluorinated aromatic hydrocarbyl moiety of from 6 to 30 carbon atoms;

z is a number greater than 0 and less than 6, and the moiety: $Ar^fAl_2Q^1_{6-z}$ is an adduct of tri (fluoroarylaluminum) with from a sub-stoichiometric to a super-stoichiometric amount of a trialkylaluminum having from 1 to 20 carbons in each alkyl group.

Examples of specific non-ionic aluminum Lewis acid reagents for use herein, reagent ratios, and resulting products are illustrated as follows:

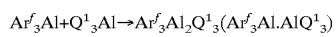

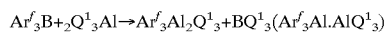

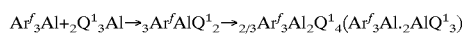

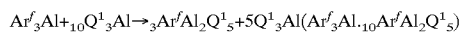

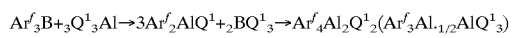

The foregoing mixtures of non-ionic Lewis acids and adducts may be readily prepared by combining the tri (fluoroaryl)aluminum compound and trialkylaluminum compound. The reaction may be performed in a solvent or diluent, or neat. Intimate contacting of the neat reactants can be effectively achieved by drying a solution of the two reactants to form a solid mixture, and thereafter optionally continuing such contacting, optionally at an elevated temperature. Preferred tri(fluoroaryl)aluminum compounds are tris(perfluoroaryl)aluminum compounds, most preferably tris(pentafluorophenyl)aluminum. The latter compound may be readily prepared by ligand exchange of a trifluoroarylboron compound and a trialkylaluminum compound, especially trimethyl aluminum.

The foregoing mixtures of non-ionic Lewis acids and adducts may be readily prepared by reaction of a fluoroarylborane, preferably tris(pentafluorophenyl)borane with greater than a stoichiometric amount of one or more trihydrocarbylaluminum, dihydrocarbylaluminumhydrocarbyloxides, or dihydrocarbylaluminum(dihydrocarbyl)amide compounds having up to 20 atoms other than hydrogen in each hydrocarbyl, hydrocarbyloxy or dihydrocarbylamide group, or a mixture thereof with one or more aluminoxy compounds (such as an alumoxane) substantially according to the conditions disclosed in U.S. Pat. No. 5,602,269.

Generally the various reagents which form the improved activators of the invention, such as the trifluoroarylboron compound and the trialkylaluminum compound are merely contacted in a hydrocarbon liquid at a temperature from 0 to 75° C., for a period from one minute to 10 days. Preferably, such contacting occurs for a period from 1 minute to 1 day, preferably at least 30 minutes to permit ligand exchange to occur to an extent sufficient to yield the advantages associated with the practice of the invention.

Preferred non-ionic Lewis acid reagents for use according to the present invention are those wherein $Ar^f$ is pentafluorophenyl, and $Q^1$ is $C_{1-4}$ alkyl. Most preferred non-ionic Lewis acids used according to the present invention are those wherein Ar is pentafluorophenyl, and $Q^1$ each occurrence is methyl, isopropyl or isobutyl.

Preferred support materials are finely particulated materials that remain solids under conditions of preparation and use and that do not interfere with subsequent polymerizations or other uses of the composition of the invention. Suitable support materials especially include particulated metal oxides, oxides of silicon or germanium, polymers, and mixtures thereof. Examples include alumina, silica, aluminosilicates, clay, and particulated polyolefins. Suitable volume average particle sizes of the support are from 1 to 1000 $\mu M$, preferably from 10 to 100 $\mu M$. Most desired supports are silica, which is thoroughly dried, suitably by heating to 200 to 900° C. for from 10 minutes to 2 days. The silica may be treated prior to use to further reduce surface hydroxyl groups thereon, or to introduce more reactive functionality than the available hydroxyl functionality for subsequent reaction with the Lewis acid. Suitable treatments include reaction with a tri($C_{1-10}$ alkyl)silylhalide, hexa($C_{1-10}$ alkyl)disilazane, tri($C_{1-10}$ alkyl)aluminum, or similar reactive compound, preferably by contacting the support and a hydrocarbon solution of the reactive compound.

In a preferred embodiment, silica is reacted with a tri (alkyl)aluminum, preferably a $C_{1-10}$ tri(alkyl)aluminum, most preferably, trimethylaluminum, triethylaluminum, triisopropylaluminum or triisobutylaluminum, to form a modified support. The amount of the trialkylaluminum is chosen to pacify 1–99% of the reactive surface species, more preferably 50–90%, as determined by titration with $Et_3Al$. Titration with $Et_3Al$ is defined as the maximum amount of aluminum that chemically reacts with the particulated solid support material and which cannot be removed by washing with an inert hydrocarbon or aromatic solvent. Thereafter this modified support is contacted with the above cocatalyst composition, or a solution thereof, in a quantity sufficient to provide an functionalized catalyst support for olefin polymerization according to the invention. In the alternative, the modified support may be contacted with a non-ionic Lewis acid and, e.g., a trihydrocarbyl aluminum, dihydrocarbylaluminum hydrocarbyloxide or dihydrocarbylaluminum (dihydrocarbyl) amide, to form the cocatalyst reactant in situ.

Particulated polymeric supports, while less preferred than inorganic oxide supports, may be utilized. Such particulated polymeric supports are preferably are also functionalized to provide hydroxyl, carboxylic acid or sulfonic acid reactive groups. The resulting substrate material formed by reaction with the non-ionic Lewis acid will accordingly bear the corresponding oxy-, carboxy- or sulfoxy-linking group, D.

The non-ionic Lewis acid and particulated support material may be combined and reacted in any aliphatic, alicyclic or aromatic liquid diluent, or solvent, or mixture thereof. Preferred diluents or solvents are $C_{4-10}$ hydrocarbons and mixtures thereof, including hexane, heptane, cyclohexane, and mixed fractions such as Isopar™ E, available from Exxon Chemicals Inc. Preferred contacting times are at least one hour, preferably at least 90 minutes, at a temperature from 0 to 75° C., preferably from 20 to 50° C., most preferably from 25 to 35° C. Desirably, the contacting is also done prior to addition of a metal complex catalyst, such as a metallocene, to the mixture or either component separately, in order to avoid formation of further derivatives and multiple metal exchange products having reduced catalytic effectiveness. After contacting of the support and Lewis acid, the reaction mixture may be purified to remove byproducts, especially any trialkylboron compounds by any suitable technique. Alternatively, but less desirably, a Group 3–10 metal complex catalyst may first be combined with the reaction mixture prior to removing byproducts.

Suitable techniques for removing byproducts from the reaction mixture include degassing, optionally at reduced pressures, distillation, solvent exchange, solvent extraction, extraction with a volatile agent, and combinations of the foregoing techniques, all of which are conducted according to conventional procedures. Preferably the quantity of residual byproduct is less than 10 weight percent, more preferably less than 1.0 weight percent, most preferably less than 0.1 weight percent, based on the weight of the functionalized catalyst support.

Highly preferred compounds according to the invention are those comprising less than one tri(alkyl)aluminum moeity per tri(fluoroaryl)aluminum moiety. Most highly desired adducts are those corresponding to the formula: $Ar^f_4Al_2Q^1_2$ and $Ar^f_5Al_2Q^1$. Such compositions possess extremely high catalyst activation properties.

The support material and cocatalyst derived from the nonionic Lewis acid are preferably reacted to chemically attach a plurality of the functional groups to the surface of the support. The reaction is also preferably conducted prior to formation of the active polymerization catalyst by addition of a metal complex.

Suitable metal complexes for use in combination with the foregoing functionalized catalyst supports include any complex of a metal of Groups 3–10 of the Periodic Table of the Elements capable of being activated to polymerize addition polymerizable compounds, especially olefins by the present activators.

Suitable complexes include derivatives of Group 3, 4, or Lanthanide metals containing from 1 to 3 π-bonded anionic or neutral ligand groups, which may be cyclic or non-cyclic delocalized π-bonded anionic ligand groups. Exemplary of such π-bonded anionic ligand groups are conjugated or nonconjugated, cyclic or non-cyclic dienyl groups, allyl groups, boratabenzene groups, and arene groups. By the term "π-bonded" is meant that the ligand group is bonded to the transition metal by a sharing of electrons from a partially delocalized π-bond.

Each atom in the delocalized π-bonded group may independently be substituted with a radical selected from the group consisting of hydrogen, halogen, hydrocarbyl, halohydrocarbyl, hydrocarbyl-substituted metalloid radicals wherein the metalloid is selected from Group 14 of the Periodic Table of the Elements, and such hydrocarbyl- or hydrocarbyl-substituted metalloid radicals further substituted with a Group 15 or 16 hetero atom containing moiety. Included within the term "hydrocarbyl" are $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals. In addition two or more such radicals may together form a fused ring system, including partially or fully hydrogenated fused ring systems, or they may form a metallocycle with the metal. Suitable hydrocarbyl-substituted organometalloid radicals include mono-, di- and tri-substituted organometalloid radicals of Group 14 elements wherein each of the hydrocarbyl groups contains from 1 to 20 carbon atoms. Examples of suitable hydrocarbyl-substituted organometalloid radicals include trimethylsilyl, triethylsilyl, ethyldimethylsilyl, methyldiethylsilyl, triphenylgermyl, and trimethylgermyl groups. Examples of Group 15 or 16 hetero atom containing moieties include amine, phosphine, ether or thioether moieties or divalent derivatives thereof, e.g. amide, phosphide, ether or thioether groups bonded to the transition metal or Lanthanide metal, and bonded to the hydrocarbyl group or to the hydrocarbyl-substituted metalloid containing group.

Examples of suitable anionic, delocalized π-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, decahydroanthracenyl groups, and boratabenzene groups, as well as $C_{1-10}$ hydrocarbyl-substituted or $C_{1-10}$ hydrocarbyl-substituted silyl substituted derivatives thereof. Preferred anionic delocalized π-bonded groups are cyclopentadienyl, pentamethylcyclopentadienyl, tetramethylcyclopentadienyl, tetramethylsilylcyclopentadienyl, indenyl, 2,3-dimethylindenyl, fluorenyl, 2-methylindenyl, 2-methyl-4-phenylindenyl, tetrahydrofluorenyl, octahydrofluorenyl, and tetrahydroindenyl.

Suitable metal complexes include Group 10 diimine derivatives corresponding to the formula:

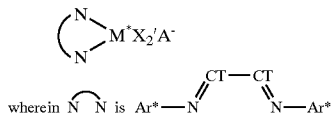

wherein $\widehat{N\ N}$ is $Ar^*-N\overset{CT-CT}{=\!=\!=}N-Ar^*$

M* is Ni(II) or Pd(II);
X' is halo, hydrocarbyl, or hydrocarbyloxy;
Ar* is an aryl group, especially 2,6-diisopropylphenyl or aniline group;
CT—CT is 1,2-ethanediyl, 2,3-butanediyl, or form a fused ring system wherein the two T groups together are a 1,8-naphthanediyl group; and A⁻ is the anionic component of the foregoing charge separated activators.

Similar complexes to the foregoing are also disclosed by M. Brookhart, et al., in *J. Am. Chem. Soc.*, 118, 267–268 (1996) and *J. Am. Chem. Soc.*, 117, 6414–6415 (1995), as being active polymerization catalysts especially for polymerization of α-olefins, either alone or in combination with polar comonomers such as vinyl chloride, alkyl acrylates and alkyl methacrylates.

The boratabenzenes are anionic ligands which are boron containing analogues to benzene. They are previously known in the art having been described by G. Herberich, et al., in *Organometallics*, 1995, 14, 1, 471–480. Preferred boratabenzenes correspond to the formula:

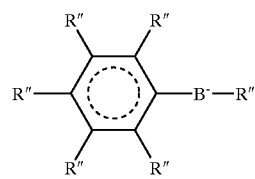

wherein R″ is selected from the group consisting of hydrocarbyl, silyl, or germyl, said R″ having up to 20 non-hydrogen atoms. In complexes involving divalent derivatives of such delocalized π-bonded groups one atom thereof is bonded by means of a covalent bond or a covalently bonded divalent group to another atom of the complex thereby forming a bridged system.

More preferred are metal complexes corresponding to the formula:

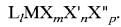

or a dimer thereof
wherein:
L is an anionic, delocalized, π-bonded group that is bound to M, containing up to 50 nonhydrogen atoms, optionally two L groups may be joined together through one or more substituents thereby forming a bridged structure, and further optionally one L may be bound to X through one or more substituents of L;

M is a metal of Group 4 of the Periodic Table of the Elements in the +2, +3 or +4 formal oxidation state;

X is an optional, divalent substituent of up to 50 non-hydrogen atoms that together with L forms a metallocycle with M;

X' is an optional neutral Lewis base having up to 20 non-hydrogen atoms;

X″ each occurrence is a monovalent, anionic moiety having up to 40 non-hydrogen atoms, optionally, two X″ groups may be covalently bound together forming a divalent dianionic moiety having both valences bound to M, or form a neutral, conjugated or nonconjugated diene that is π-bonded to M (whereupon M is in the +2 oxidation state), or further optionally one or more X″ and one or more X'groups may be bonded together thereby forming a moiety that is both covalently bound to M and coordinated thereto by means of Lewis base functionality;

l is 1 or 2;
m is 0 or 1;
n is a number from 0 to 3;
p is an integer from 0 to 3; and
the sum, l+m+p, is equal to the formal oxidation state of M.

Such preferred complexes include those containing either one or two L groups. The latter complexes include those containing a bridging group linking the two L groups. Preferred bridging groups are those corresponding to the formula $(ER^*_2)_x$ wherein E is silicon or carbon, $R^*$ independently each occurrence is hydrogen or a group selected from silyl, hydrocarbyl, hydrocarbyloxy and combinations thereof, said $R^*$ having up to 30 carbon or silicon atoms, and x is 1 to 8. Preferably,, $R^*$ independently each occurrence is methyl, benzyl, tert-butyl or phenyl.

Examples of the foregoing bis(L) containing complexes are compounds corresponding to the formula:

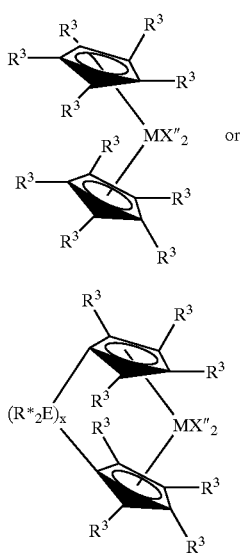

wherein:

M is titanium, zirconium or hafnium, preferably zirconium or hafnium, in the +2 or +4 formal oxidation state;

$R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (that is, a hydrocarbadiyl, siladiyl or germadiyl group) thereby forming a fused ring system, and X" independently each occurrence is an anionic ligand group of up to 40 nonhydrogen atoms, or two X" groups together form a divalent anionic ligand group of up to 40 nonhydrogen atoms or together are a conjugated diene having from 4 to 30 non-hydrogen atoms forming a π-complex with M, whereupon M is in the +2 formal oxidation state, and $R^*$, E and x are as previously defined.

The foregoing metal complexes are especially suited for the preparation of polymers having stereoregular molecular structure. In such capacity it is preferred that the complex possess $C_2$ symmetry or possess a chiral, stereorigid structure. Examples of the first type are compounds possessing different delocalized π-bonded systems, such as one cyclopentadienyl group and one fluorenyl group. Similar systems based on Ti(IV) or Zr(IV) were disclosed for preparation of syndiotactic olefin polymers in Ewen, et al., *J. Am. Chem. Soc.* 110, 6255–6256 (1980). Examples of chiral structures include bis-indenyl complexes. Similar systems based on Ti(IV) or Zr(IV) were disclosed for preparation of isotactic olefin polymers in Wild et al., *J. Organomet. Chem,* 232, 233–47, (1982).

Exemplary bridged ligands containing two π-bonded groups are: (dimethylsilyl-bis-cyclopentadienyl), (dimethylsilyl-bis-methylcyclopentadienyl), (dimethylsilyl-bis-ethylcyclopentadienyl, (dimethylsilyl-bis-t-butylcyclopentadienyl), (dimethylsilyl-bis-tetramethylcyclopentadienyl), (dimethylsilyl-bis-indenyl), (dimethylsilyl-bis-tetrahydroindenyl), (dimethylsilyl-bis-fluorenyl), (dimethylsilyl-bis-tetrahydrofluorenyl), (dimethylsilyl-bis-2-methyl-4-phenylindenyl), (dimethylsilyl-bis-2-methylindenyl), (dimethylsilyl-cyclopentadienyl-fluorenyl), (1,1,2,2-tetramethyl-1,2-disilyl-bis-cyclopentadienyl), (1,2-bis(cyclopentadienyl) ethane, and (isopropylidene-cyclopentadienyl-fluorenyl).

Preferred X" groups are selected from hydride, hydrocarbyl, silyl, germyl, halohydrocarbyl, halosilyl, silylhydrocarbyl and aminohydrocarbyl groups, or two X" groups together form a divalent derivative of a conjugated diene or else together they form a neutral, π-bonded, conjugated diene. Most preferred X" groups are $C_{1-20}$ hydrocarbyl groups.

A further class of metal complexes utilized in the present invention correspond to the formula:

$$L_lMX_mX'_nX''_p$$

or a dimer thereof wherein:

L is an anionic, delocalized, π-bonded group that is bound to M, containing up to 50 nonhydrogen atoms;

M is a metal of Group 4 of the Periodic Table of the Elements in the +2, +3 or +4 formal oxidation state;

X is a divalent substituent of up to 50 non-hydrogen atoms that together with L forms a metallocycle with M;

X' is an optional neutral Lewis base ligand having up to 20 non-hydrogen atoms;

X" each occurrence is a monovalent, anionic moiety having up to 20 non-hydrogen atoms, optionally two X" groups together may form a divalent anionic moiety having both valences bound to M or a neutral $C_{5-30}$ conjugated diene, and further optionally X' and X" may be bonded together thereby forming a moiety that is both covalently bound to M and coordinated thereto by means of Lewis base functionality;

l is 1 or 2;

m is 1;

n is a number from 0 to 3;

p is an integer from 1 to 2; and the sum, l+m+p, is equal to the formal oxidation state of M.

Preferred divalent X substituents preferably include groups containing up to 30 nonhydrogen atoms comprising at least one atom that is oxygen, sulfur, boron or a member of Group 14 of the Periodic Table of the Elements directly attached to the delocalized π-bonded group, and a different atom, selected from the group consisting of nitrogen, phosphorus, oxygen or sulfur that is covalently bonded to M.

A preferred class of such Group 4 metal coordination complexes used according to the present invention correspond to the formula:

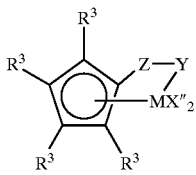

wherein:
M is titanium or zirconium in the +2 or +4 formal oxidation state;
$R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (that is, a hydrocarbadiyl, siladiyl or germadiyl group) thereby forming a fused ring system,
each X" is a halo, hydrocarbyl, hydrocarbyloxy or silyl group, said group having up to 20 nonhydrogen atoms, or two X" groups together form a $C_{5-30}$ conjugated diene;
Y is —O—, —S—, —NR*—, —PR*—; and
Z is $SiR*_2$, $CR*_2$, $SiR*_2SiR*_2$, $CR*_2CR*_2$, $CR*=CR*$, $CR*_2SiR*_2$, or $GeR*_2$, wherein: R* is as previously defined.

Illustrative Group 4 metal complexes that may be employed in the practice of the present invention include:
cyclopentadienyltitaniumtrimethyl,
cyclopentadienyltitaniumtriethyl,
cyclopentadienyltitaniumtriisopropyl,
cyclopentadienyltitaniumtriphenyl,
cyclopentadienyltitaniumtribenzyl,
cyclopentadienyltitanium-2,4-pentadienyl,
cyclopentadienyltitaniumdimethylmethoxide,
cyclopentadienyltitaniumdimethylchloride,
pentamethylcyclopentadienyltitaniumtrimethyl,
indenyltitaniumtrimethyl,
indenyltitaniumtriethyl,
indenyltitaniumtripropyl,
indenyltitaniumtriphenyl,
tetrahydroindenyltitaniumtribenzyl,
pentamethylcyclopentadienyltitaniumtriisopropyl,
pentamethylcyclopentadienyltitaniumtribenzyl,
pentamethylcyclopentadienyltitaniumdimethylmethoxide,
pentamethylcyclopentadienyltitaniumdimethylchloride,
($\eta^5$-2,4-dimethyl-1,3-pentadienyl)titaniumtrimethyl,
octahydrofluorenyltitaniumtrimethyl,
tetrahydroindenyltitaniumtrimethyl,
tetrahydrofluorenyltitaniumtrimethyl,
(1,1-dimethyl-2,3,4,9,10-$\eta$-1,4,5,6,7,8-hexahydronaphthalenyl)titaniumtrimethyl,
(1,1,2,3-tetramethyl-2,3,4,9,10-$\eta$-1,4,5,6,7,8-hexahydronaphthalenyl)titaniumtrimethyl,
(tert-butylamido)(tetramethyl-$\eta^5$-cyclopentadienyl)dimethylsilanetitanium dichloride,
(tert-butylamido)(tetramethyl-$\eta^5$-cyclopentadienyl)dimethylsilanetitanium dimethyl,
(tert-butylamido)(tetramethyl-$\eta^5$-cyclopentadienyl)-1,2-ethanediyltitanium dimethyl,
(tert-butylamido)(hexamethyl-$\eta^5$-indenyl)dimethylsilanetitanium dimethyl,
(tert-butylamido)(tetramethyl-$\eta^5$-cyclopentadienyl)dimethylsilane titanium (III) 2-(dimethylamino)benzyl;
(tert-butylamido)(tetramethyl-$\eta^5$-cyclopentadienyl)dimethylsilanetitanium (III) allyl,
(tert-butylamido)(tetramethyl-$\eta^5$-cyclopentadienyl)dimethylsilanetitanium (II) 1,4-diphenyl-1,3-butadiene,
(tert-butylamido)(2-methylindenyl)dimethylsilanetitanium (II) 1,4-diphenyl-1,3-butadiene,
(tert-butylamido)(2-methylindenyl)dimethylsilanetitanium (IV) 1,3-butadiene,
(tert-butylamido)(2,3-dimethylindenyl)dimethylsilanetitanium (II) 1,4-diphenyl-1,3-butadiene,
(tert-butylamido)(2,3-dimethylindenyl)dimethylsilanetitanium (IV) 1,3-butadiene,
(tert-butylamido)(2,3-dimethylindenyl)dimethylsilanetitanium (II) 1,3-pentadiene,
(tert-butylamido)(2-methylindenyl)dimethylsilanetitanium (II) 1,3-pentadiene,
(tert-butylamido)(2-methylindenyl)dimethylsilanetitanium (IV) dimethyl,
(tert-butylamido)(2-methyl-4-phenylindenyl)dimethylsilanetitanium (II) 1,4-diphenyl-1,3-butadiene,
(tert-butylamido)(tetramethyl-$\eta^5$-cyclopentadienyl)dimethylsilanetitanium (IV) 1,3-butadiene,
(tert-butylamido)(tetramethyl-$\eta^5$-cyclopentadienyl)dimethylsilanetitanium (II) 1,4-dibenzyl-1,3-butadiene,
(tert-butylamido)(tetramethyl-$\eta^5$-cyclopentadienyl)dimethylsilanetitanium (II) 2,4-hexadiene,
(tert-butylamido)(tetramethyl-$\eta^5$-cyclopentadienyl)dimethylsilanetitanium (II) 3-methyl 1,3pentadiene,
(tert-butylamido)(2,4-dimethyl-1,3-pentadien-2-yl)dimethylsilanetitaniumdimethyl,
(tert-butylamido)(1,1-dimethyl-2,3,4,9,10-$\eta$-1,4,5,6,7,8-hexahydronaphthalen-4-yl)dimethylsilanetitaniumdimethyl,
(tert-butylamido)(1,1,2,3-tetramethyl-2,3,4,9,10-$\eta$-1,4,5,6,7,8-hexahydronaphthalen-4-yl)dimethylsilanetitaniumdimethyl,
(tert-butylamido)(tetramethylcyclopentadienyl)dimethylsilanetitanium 1,3-pentadiene,
(tert-butylamido)(3-(N-pyrrolidinyl)inden-1-yl)dimethylsilanetitanium 1,3-pentadiene,
(tert-butylamido)(2-methyl-s-indacen-1-yl)dimethylsilanetitanium 1,3-pentadiene, and
(tert-butylamido)(3,4-cyclopenta(/)phenanthren-2-yl)dimethylsilanetitanium 1,4-diphenyl-1,3-butadiene.

Bis(L) containing complexes including bridged complexes suitable for use in the present invention include:
biscyclopentadienylzirconiumdimethyl,
biscyclopentadienyltitaniumdiethyl,
biscyclopentadienyltitaniumdiisopropyl,
biscyclopentadienyltitaniumdiphenyl,
biscyclopentadienylzirconium dibenzyl,
biscyclopentadienyltitanium-2,4-pentadienyl,
biscyclopentadienyltitaniummethylmethoxide,
biscyclopentadienyltitaniummethylchloride,
bispentamethylcyclopentadienyltitaniumdimethyl,
bisindenyltitaniumdimethyl,
indenylfluorenyltitaniumdiethyl,
bisindenyltitaniummethyl(2-(dimethylamino)benzyl),
bisindenyltitanium methyltrimethylsilyl,
bistetrahydroindenyltitanium methyltrimethylsilyl,
bispentamethylcyclopentadienyltitaniumdiisopropyl,
bispentamethylcyclopentadienyltitaniumdibenzyl,
bispentamethylcyclopentadienyltitaniummethylmethoxide,
bispentamethylcyclopentadienyltitaniummethylchloride,
(dimethylsilyl-bis-cyclopentadienyl)zirconiumdimethyl,
(dimethylsilyl-bis-pentamethylcyclopentadienyl)titanium-2,4pentadienyl,
(dimethylsilyl-bis-t-butylcyclopentadienyl)zirconiumdichloride, (methylene-bis-pentamethylcyclopentadienyl)titanium(III) 2-(dimethylamino)benzyl,
(dimethylsilyl-bis-indenyl)zirconiumdichloride,
(dimethylsilyl-bis-2-methylindenyl)zirconiumdimethyl,
(dimethylsilyl-bis-2-methyl-4-phenylindenyl) zirconiumdimethyl,
(dimethylsilyl-bis-2-methylindenyl)zirconium-1,4-diphenyl-1,3-butadiene,
(dimethylsilyl-bis-2-methyl-4-phenylindenyl)zirconium (II) 1,4-diphenyl-1,3-butadiene,
(dimethylsilyl-bis-tetrahydroindenyl)zirconium(II) 1,4-diphenyl-1,3-butadiene,
(dimethylsilyl-bis-fluorenyl)zirconiumdichloride,
(dimethylsilyl-bis-tetrahydrofluorenyl)zirconiumdi (trimethylsilyl),
(isopropylidene)(cyclopentadienyl)(fluorenyl) zirconiumdibenzyl, and
(dimethylsilylpentamethylcyclopentadienylfluorenyl) zirconiumdimethyl.

Suitable polymerizable monomers include ethylenically unsaturated monomers, acetylenic compounds, conjugated or non-conjugated dienes, and polyenes. Preferred monomers include olefins, for examples alpha-olefins having from 2 to 20,000, preferably from 2 to 20, more preferably from 2 to 8 carbon atoms and combinations of two or more of such alpha-olefins. Particularly suitable alpha-olefins include, for example, ethylene, propylene, 1-butene, 1-pentene, 4-methylpentene-1,1-hexene, 1-heptene, 1-octene, 1-nonene, 1-decene, 1-undecene, 1-dodecene, 1-tridecene, 1-tetradecene, 1-pentadecene, or combinations thereof, as well as long chain vinyl terminated oligomeric or polymeric reaction products formed during the polymerization, and $C_{10-30}$ α-olefins specifically added to the reaction mixture in order to produce relatively long chain branches in the resulting polymers. Preferably, the alpha-olefins are ethylene, propene, 1-butene, 4-methyl-pentene-1,1-hexene, 1-octene, and combinations of ethylene and/or propene with one or more of such other alpha-olefins. Other preferred monomers include styrene, halo- or alkyl substituted styrenes, tetrafluoroethylene, vinylcyclobutene, 1,4-hexadiene, dicyclopentadiene, ethylidene norbornene, and 1,7-octadiene. Mixtures of the above-mentioned monomers may also be employed.

In general, the polymerization may be accomplished at conditions well known in the prior art for Ziegler-Natta or Kaminsky-Sinn type polymerization reactions conducted under slurry or gas phase polymerization conditions. Preferred polymerization temperatures are from 0–250° C. Preferred polymerization pressures are from atmospheric to 3000 atmospheres.

Molecular weight control agents can be used in combination with the present cocatalysts. Examples of such molecular weight control agents include hydrogen, silanes or other known chain transfer agents.

Gas phase processes for the polymerization of $C_{2-6}$ olefins, especially the homopolymerization and copolymerization of ethylene and propylene, and the copolymerization of ethylene with $C_{3-6}$ α-olefins such as, for example, 1-butene, 1-hexene, 4-methyl-1-pentene are well known in the art. Such processes are used commercially on a large scale for the manufacture of high density polyethylene (HDPE), medium density polyethylene (MDPE), linear low density polyethylene (LLDPE) and polypropylene, especially isotactic polypropylene.

The gas phase process employed can be, for example, of the type which employs a mechanically stirred bed or a gas fluidized bed as the polymerization reaction zone. Preferred is the process wherein the polymerization reaction is carried out in a vertical cylindrical polymerization reactor containing a fluidized bed of polymer particles supported above a perforated plate, the fluidization grid, by a flow of fluidization gas.

The gas employed to fluidize the bed comprises the monomer or monomers to be polymerized, and also serves as a heat exchange medium to remove the heat of reaction from the bed. The hot gases emerge from the top of the reactor, normally via a tranquilization zone, also known as a velocity reduction zone, having a wider diameter than the fluidized bed and wherein fine particles entrained in the gas stream have an opportunity to gravitate back into the bed. It can also be advantageous to use a cyclone to remove ultra-fine particles from the hot gas stream. The gas is then normally recycled to the bed by means of a blower or compressor and one or more heat exchangers to strip the gas of the heat of polymerization.

A preferred method of cooling of the bed, in addition to the cooling provided by the cooled recycle gas, is to feed a volatile liquid to the bed to provide an evaporative cooling effect. The volatile liquid employed in this case can be, for example, a volatile inert liquid, for example, a saturated hydrocarbon having 3 to 8, preferably 4 to 6, carbon atoms. In the case that the monomer or comonomer itself is a volatile liquid, or can be condensed to provide such a liquid this can be suitably be fed to the bed to provide an evaporative cooling effect. Examples of olefin monomers which can be employed in this manner are olefins containing from 3 to eight, preferably from 3 to six carbon atoms. The volatile liquid evaporates in the hot fluidized bed to form gas which mixes with the fluidizing gas. It the volatile liquid is a monomer or comonomer, it will undergo some polymerization in the bed. The evaporated liquid then emerges from the reactor as part of the hot recycle gas, and enters the compression/heat exchange part of the recycle loop. The recycle gas is cooled in the heat exchanger and, if the temperature to which the gas is cooled is below the dew point, liquid will precipitate from the gas. This liquid is desirably recycled continuously to the fluidized bed. It is possible to recycle the precipitated liquid to the bed as liquid droplets carried in the recycle gas stream, as described, for example, in EP-A-89691, U.S. Pat. No. 4,543,399, WO 94/25495 and U.S. Pat. No. 5,352,749, which are hereby incorporated by reference. A particularly preferred method of recycling the liquid to the bed is to separate the liquid from the recycle gas stream and to reinject this liquid directly into the bed, preferably using a method which generates fine droplets of the liquid within the bed. This type of process is described in WO 94/28032, the teachings of which are also hereby incorporated by reference.

The polymerization reaction occurring in the gas fluidized bed is catalyzed by the continuous or semi-continuous addition of catalyst. The catalyst can also be subjected to a prepolymerization step, for example, by polymerizing a small quantity of olefin monomer in a liquid inert diluent, to provide a catalyst composite comprising catalyst particles embedded in olefin polymer particles.

The polymer is produced directly in the fluidized bed by catalyzed (co)polymerization of the monomer(s) on the fluidized particles of catalyst, supported catalyst or prepolymer within the bed. Start-up of the polymerization reaction is achieved using a bed of preformed polymer particles, which, preferably, is similar to the target polyolefin, and conditioning the bed by drying with inert gas or nitrogen prior to introducing the catalyst, the monomer(s) and any other gases which it is desired to have in the recycle gas stream, such as a diluent gas, hydrogen chain transfer agent, or an inert condensable gas when operating in gas phase condensing mode. The produced polymer is discharged continuously or discontinuously from the fluidized bed as desired, optionally exposed to a catalyst kill and optionally pelletized.

Supported catalysts for use in slurry polymerization may be prepared and used according to previously known techniques. Generally such catalysts are prepared by the same techniques as are employed for making supported catalysts used in gas phase polymerizations. Slurry polymerization conditions generally encompass polymerization of a $C_{2-20}$ olefin, diolefin, cycloolefin, or mixture thereof in an aliphatic solvent at a temperature below that at which the polymer is readily soluble in the presence of a supported catalyst. Slurry phase processes particularly suited for the polymerization of $C_{2-6}$ olefins, especially the homopolymerization and copolymerization of ethylene and propylene, and the copolymerization of ethylene with $C_{3-8}$ α-olefins such as, for example, 1-butene, 1-hexene, 4-methyl-1-pentene and 1-octene are well known in the art. Such processes are used commercially on a large scale for the manufacture of high density polyethylene (HDPE), medium density polyethylene (MDPE), linear low density polyethylene (LLDPE) and polypropylene, especially isotactic polypropylene.

It is understood that the present invention is operable in the absence of any component which has not been specifically disclosed. The following examples are provided in order to further illustrate the invention and are not to be construed as limiting. Unless stated to the contrary, all parts and percentages are expressed on a weight basis. Where stated the term "room temperature" refers to a temperature from 20 to 25° C., the term "overnight" refers to a time from 12 to 18 hours, and the term "mixed alkanes" refers to the aliphatic solvent, Isopar™ E, available from Exxon Chemicals Inc.

EXAMPLES

Tris(perfluorophenyl)borane was obtained as a solid from Boulder Scientific Inc. and used without further purification. Modified methalumoxane (MMAO-3A) in heptane was purchased from Akzo-Nobel. MAO and trimethylaluminum (TMA) both in toluene were purchased from Aldrich Chemical Co. Tris(perfluorophenyl)aluminum (FAAL) in toluene was prepared by exchange reaction between tris (perfluorophenyl)borane and trimethylaluminum. Davison™ 948 silica was purchased from Grace-Davison Incorporated. All solvents were purified using the technique disclosed by Pangborn et al, *Organometallics*, 1996, 15, 1518–1520. All compounds and solutions were handled under an inert atmosphere (dry box).

Example 1

Tris(pentafluorophenyl)boron (5.775 g, 11.3 mmol) was dissolved in toluene (100 mL). A solution of MMAO-3A in heptane (11.6 mL of a 7.1 wt. percent Al solution, Akzo) was added and the mixture agitated on a mechanical shaker for 15 minutes. The volatiles were removed in vacuo to give a pale yellow glass. 200 mL of toluene was added to dissolve the material and the resulting solution was added to 2 g of Davison™ 948 silica that had been dehydrated at 250° C. for 3 hours in air. The mixture was agitated for 3 days. The slurry was collected on a fritted funnel and the resulting solid washed with 50 mL toluene and dried in vacuo. Yield=2.9 g; [Al]=8.2 wt. percent. 1 g of the treated support was slurried in 10 mL hexane. 0.2 mL of a 0.2 M solution of titanium, (N-1,1-dimethylethyl)dimethyl(1-(1,2,3,4,5-eta)-2,3,4,5-tetramethyl-2,4-cyclopentadien-1-yl) silanaminato))(2-)N)-($\eta^4$-1,3-pentadiene) ($C_5Me_4SiMe_2N^tBu)Ti(\eta^4$-1,3-pentadiene) in mixed alkanes was added and the mixture was agitated 30 minutes resulting in the formation of a green solid phase and a colorless supernatant. The solid was collected on a fritted funnel, washed with 30 mL hexane and dried in vacuo.

Gas Phase Polymerization

Continuous gas phase polymerization was carried out in a 6 liter gas phase reactor having a two inch diameter 12 inch long fluidization zone and an eight inch diameter eight inch long velocity reduction zone connected by a transition section having tapered walls. Typical operating conditions ranged from 40 to 100° C., 100 to 350 psig (0.7 to 2.4 MPa) total pressure and up to 8 hours reaction time. Monomer, comonomer, and other gases entered the bottom of the reactor where they passed through a gas distributor plate. The flow of the gas was 2 to 8 times the minimum particle fluidization velocity [*Fluidization Engineering*, 2nd Ed., D. Kunii and O. Levenspiel, 1991, Butterworth-Heinemann]. Most of the suspended solids disengaged in the velocity reduction zone. The gases exited the top of the velocity reduction zone and passed through a dust filter to remove any fines. The gases then passed through a gas booster pump. The polymer was allowed to accumulate in the reactor over the course of the reaction. The total system pressure was kept constant during the reaction by regulating the flow of monomer into the reactor. Polymer was removed from the reactor to a recovery vessel by opening a series of valves located at the bottom of the fluidization zone thereby discharging the polymer to a recovery vessel kept at a lower pressure than the reactor. The pressures of monomer, comonomer and other gases reported refer to partial pressures. The catalyst prepared above, 0.05 g, was loaded into a catalyst injector in an inert atmosphere glove box. The injector was removed from the glove box and inserted into the top of the reactor. The catalyst was added to the semi-batch gas phase reactor which was under an ethylene (monomer) pressure of 6.5 bar (0.65 MPa), a 1-butene (comonomer) pressure of 0.14 bar (14 kPa), a hydrogen pressure of 0.04 bar (4 kPa) and a nitrogen pressure of 2.8 bar (0.28 MPa). The temperature of polymerization throughout the run was 70° C. Polymer was allowed to accumulate for 90 minutes. The total system pressure was kept constant during the reaction by regulating the flow of monomer into the reactor. The yield of dry, free flowing, ethylene/1-butene copolymer powder was 64.7 gram.

A comparative catalyst prepared without the use of $B(C_6F_5)_3$ (only MMAO treated silica support) yielded 2.7 g powder under identical polymerization conditions.

Example 2

3 g of Davison 948 silica, which had been dehydrated by heating in air for 3 hours at 250° C., was slurried in toluene (30 mL). 4.5 mL of a 1 M solution of triethylaluminum in hexane was added and the mixture agitated for 15 minutes. The solid was collected on a fritted funnel, washed with 20 mL of toluene followed by 20 mL of hexane. The solid was reslurried in toluene (30 mL). In a separate vessel a solution of tris(pentafluorophenyl)borane (0.768 g, 1.5 mmol) in toluene (30 mL) was treated with 1.5 mL of a 1M solution of triethylaluminum in hexane. The mixture was agitated for 10 minutes and then added to the slurry of the treated silica. The mixture was agitated five hours, collected on a fritted funnel, washed with two 30 mL portions of toluene followed by 30 mL hexane and then dried in vacuo.

A 2 g sample was slurried in 20 mL hexane and 0.5 mL of a 0.2M solution of $(C_5Me_4SiMe_2N^tBu)Ti(\eta^4\text{-}1,3\text{-pentadiene})$ in Isopar™ E was added. The mixture was agitated two hours, filtered on a fritted funnel, and the green solid was washed with two 20 mL portions of hexane and then dried in vacuo.

Slurry Phase Polymerization

A stirred 4 L reactor was charged with 2.8 L of hexane and then heated to 70° C. A scavenger, 0.5 g of TEA/silica, was introduced to the reactor. Ethylene was then added to the reactor in an amount sufficient to bring the total pressure to 12 bar (1.2 MPa). A 0.4 gram aliquot of the catalyst prepared as described above was then added to initiate the polymerization. The reactor pressure was kept essentially constant by continually feeding ethylene on demand during the polymerization reaction. The temperature was kept substantially constant by cooling the reactor as required. After 60 minutes the ethylene feed was shut off and the contents of the reactor were transferred to a sample pan. After drying, 160 gram of a free flowing polyethylene powder of bulk density 0.40 g/cm$^3$ was obtained.

Gas Phase Polymerization

The polymerization conditions of Example 1 were substantially repeated using 0.325 g of the above supported catalyst. The yield of dry, free flowing, ethylene/1-butene copolymer powder was 112.5 grams.

Example 3

To 15.04 g Davison™ 948 silica (heated in air at 250° C. for four hours) was slurried in 90 mL hexane, and an excess (2.0 mmol/g, 30 mL of a 1.0 M solution in hexanes) of triethylaluminum was added. The mixture was agitated for 12 hours. The solids were collected on a fritted funnel, washed three times with 50 mL portions of hexanes, and dried in vacuo. To 2.00 g of this material was added 50 mL of a 0.023 M solution of $Al(C_6F_5)_3$ in toluene. The mixture was agitated on a mechanical shaker for 15 hours. The slurry was evacuated to dryness. The solids were then reslurried in toluene, collected on a fritted funnel, washed two times with 30 mL toluene, and dried in vacuo. To 1.73 g of this material slurried in 15 mL hexane was added 410 µL of a 0.202 M mixed alkanes solution of $(C_5Me_4SiMe_2N^tBu)Ti(\eta^4\text{-}1,3\text{-pentadiene})$. The mixture was shaken for 1 hour, then the solids were collected on a fritted funnel, washed twice with hexane, and dried in vacuo.

Gas Phase Polymerization

The polymerization conditions of Example 1 were substantially repeated using 0.075 g of the above supported catalyst. The yield of dry, free flowing ethylene/1-butene copolymer powder was 43 grams.

Example 4

Solutions (10 mmol each) of $B(C_6F_5)_3$ and $AlMe_3$ in toluene were added to 2.0 g Davison™ 948 silica which has been dried at 250° C. for 2 hours. The slurry was shaken for 2 days. At this time, the solids were collected on a fritted funnel, washed 3 times with toluene, and dried in vacuo. The solids were reslurried in 15 mL of mixed hexanes, and 0.5 mL of a 0.202 M solution of (t-butylamido)dimethyl-(tetramethylcyclopentadienyl)silanetitanium 1,3-pentadiene in mixed alkanes was added for a nominal loading of 50 µmol/g. The silica quickly turned dark green leaving a pale yellow filtrate. The slurry was shaken for 1 hour on a mechanical shaker, then the solids were collected on a fritted funnel, washed with hexane, and dried in vacuo. The solids analyzed for 29.3 µmol/g Ti and 0.96 mmol/g Al. Boron levels were below the detection limit (<50 µg/g).

Slurry Phase Polymerization

The slurry phase polymerization in example 2 was substantially repeated using a 0.379 gram aliquot of the catalyst prepared as described above. After 30 minutes, the yield of free lowing polyethylene was 109 g.

Gas Phase Polymerization

The polymerization conditions of Example 1 were substantially repeated using 0.065 g of the above supported catalyst. The yield of dry, free flowing ethylene/1-butene copolymer powder was 51 grams.

Example 5

To 1.95 mmol of tris(pentafluorophenyl)borane $(B(C_6F_5)_3)$ in 40 mL toluene was added 3.91 mmol $AlMe_3$ in toluene to form $(C_6F_5)_3Me_3Al_2$ in situ. The product was identified by comparison to known chemical shifts in the $^{19}F\{^1H\}$ NMR. The solution was added to 0.5 g Davison™ 948 silica dried in air at 250° C. The slurry was shaken for 1 day. At this time, the solids were collected on a fritted funnel, washed 2 times with 10 mL toluene, and dried in vacuo. The solids were reslurried in 10 mL pentane, and 0.25 mL of a 0.202 M solution of (t-butylamido)dimethyl-(tetramethylcyclopentadienyl)silanetitanium 1,3-pentadiene in mixed alkanes was added. The silica quickly turned dark green leaving a red-brown filtrate. The slurry was shaken for 1 hour on a mechanical shaker, then the solids were collected on a fritted funnel, washed with 2×10 mL pentane, and dried in vacuo.

Gas Phase Polymerization

The polymerization conditions of Example 1 were substantially repeated using 0.05 g of the above supported catalyst. The yield of dry, free flowing, ethylene/1-butene copolymer powder was 15.5 grams.

Example 6

To 1.95 g Davison™ 948 silica dried by heating in air at 250° C. was added 45 mL of a 0.067 M solution of $Al(C_6F_5)_3$. The slurry was shaken for 12 hours. At this time, the solids were collected on a fritted funnel, washed once with 20 mL toluene and twice with 20 mL hexane, and dried in vacuo A 0.5 mL aliquot of the pre-wash solution was mixed with 0.25 mL $C_6D_6$, and the $^{19}F\{^1H\}$ NMR spectrum was recorded: The only major resonances recorded were due to unreacted $Al(C_6F_5)_3$ and $C_6F_5H$, formed as a byproduct of the reaction of $Al(C_6F_5)_3$ with silica hydroxyl groups. δ–124.0 ($C_6F_5$—Al), –140.2 ($C_6F_5H$), –152.0 ($C_6F_5$—Al), –155.2 ($C_6F_5H$), –161.8 ($C_6F_5$—Al), –163.6 ($C_6F_5H$) ppm. The ratio of unreacted $Al(C_6F_5)_3$ to pentafluorobenzene was approximately 0.75:1.

The above solids were slurried in 20 mL hexane, and 0.50 mL of a 0.202 M solution of (t-butylamido)dimethyl-(tetramethylcyclopentadienyl)silanetitanium 1,3-pentadiene in mixed alkanes was added. The silica quickly turned dark green, leaving a colorless filtrate. After 2 minutes, a second 0.50 mL of the 0.202 M solution of (t-butylamido)dimethyl-(tetramethylcyclopentadienyl)silanetitanium 1,3-pentadiene was added. The slurry was shaken for 10 minutes, during which time the supernatant again became colorless. The solids were collected on a fritted funnel, washed with 2×10 mL pentane, and dried in vacuo.

Gas Phase Polymerization

The polymerization conditions of Example 1 were substantially repeated using 0.075 g of the above catalyst, yielding was 57 g of ethylene/1-butene copolymer as a fine free flowing powder.

What is claimed is:

1. A functionalized catalyst support comprising a particulated support material having chemically bonded thereto a plurality of non-ionic, Lewis acid, aluminum-containing groups containing at least one fluoro-substituted hydrocarbyl ligand containing from 1 to 20 carbons bonded to the aluminum, said composition being capable of activating a Group 3–10 metal complex for the addition polymerization of one or more addition polymerizable monomers.

2. A functionalized catalyst support having a chemical structure of the formula:

$$So[Me_{m1}(K^1{}_{k1})(D_d)]_s$$

wherein:

So is a particulated solid support material;

Me is aluminum;

$K^1$ independently each occurrence is a ligand group bonded to Me having from 1 to 30 atoms other than hydrogen, with the proviso that in at least one occurrence, $K^1$ is a fluoro-substituted hydrocarbyl group of from 1 to 20 carbons, and optionally two or more $K^1$ groups may be bonded together thereby forming a bridging group linking two or more Me atoms or forming a fused ring system;

k1 is a number from 1 to 5 selected to provide charge neutrality to the complex, D is an oxygen-containing bridging moiety chemically bonded to So by means of which the group, $[Me_{m1}(K^1{}_{k1})(D_d)]$, is attached to the particulated solid support;

d is a positive number from greater than 0 to 5 and less than the equal to m1, said d equaling the average number of chemical bonds to the substrate per group, $[Me_{m1}(K^1{}_{k1})(D_d)]$;

s is a number greater than or equal to 2 and is equal to the number of $[Me_{m1}(K^1{}_{k1})(D_d)]$ groups attached to the substrate, So.

3. The functionalized catalyst support of claim 2 wherein d ranges from 1 from 3.

4. The functionalized catalyst support of claim 2 wherein d is 1.

5. A functionalized catalyst support according to claim 2, wherein the support is silica, the fluorosubstituted hydrocarbyl group is a fluoroaryl group, and s is chosen to provide a concentration of $[Me_{m1}(K^1{}_{k1})(D_d)]$ groups on the support from $1 \times 10^{-5}$ μmole/gram to 2 mmole/gram.

6. A functionalized catalyst support according to claim 2, wherein $K^1$ is pentafluorophenyl and k1 equals 2.

7. A functionalized catalyst support comprising the reaction product of:

(a) a solid inorganic oxide support material and (b) the ligand exchange product derived from the contacting of a non-ionic Lewis acid which is a trifluoroarylaluminum- or trifluoroarylboron- compound with one or more trihydrocarbylaluminum-, dihydrocarbylaluminumhydrocarbyloxide-, or dihydrocarbylaluminum(dihydrocarbyl)amido- compounds having up to 20 atoms other than hydrogen in each hydrocarbyl-, hydrocarbyloxy- or dihydrocarbylamido group, or a mixture thereof.

8. A method for preparing a functionalized catalyst support comprising:

(a) slurrying a particulated support in a hydrocarbon diluent;

(b) adding a compound of the formula, $Ar^f{}_{z''}Al_2Q^1{}_{6-z''}$ in sufficient quantity to fully react with surface groups as defined by titration with $Et_3Al$, to form a treated support, where $Ar^f$ is a fluorinated aromatic hydrocarbyl moiety of from 6 to 30 carbon atoms;

z'' is a number from greater than 0 to 6, and $Q^1$ independently each occurrence is selected from the groups consisting of hydrocarbyl-, hydrocarbyloxy-, and dihydrocarbylamido-group, of from 1 to 20 atoms other than hydrogen;

(c) washing the treated support with a hydrocarbon liquid, and (d) optionally drying the functionalized catalyst support.

9. A method according to claim 8, where the support has been pretreated with $Q^1{}_3Al$, where $Q^1$ is independently selected from the group consisting of hydrocarbyl-, hydrocarbyloxy-, or dihydrocarbylamido-groups, of from 1 to 20 atoms other than hydrogen, and the amount of $Q^1{}_3Al$ is chosen to pacify 1–99% of any reactive surface species as determined by titration with $Et_3Al$.

10. A method according to claim 9, wherein the amount of $Q^1{}_3Al$ is chosen to pacify 50–90% of any reactive surface species of the support, as determined by titration with $Et_3Al$.

11. A method according to claim 8, wherein the support has been pretreated with $Q^1{}_3Al$ in a quantity from 0.1 to 1.5 mmol Al/gram support wherein $Q^1$ is as defined in claim 9.

12. A method according to any one of claims 8–11 wherein the support is an inorganic oxide.

13. A method according to claim 12 wherein the support has been calcined.

14. A supported catalyst comprising the functionalized catalyst support according to any of claims 1 to 7 and a Group 3–10 metal complex containing a substituent which reacts with the functionalized catalyst support to thereby form a composition which is catalytically active for the polymerization of olefins.

15. A supported catalyst according to claim 14, wherein the Group 3–10 metal complex contains at least one π-bonded anionic ligand group which is a conjugated or non-conjugated,, cyclic or non-cyclic dienyl group, an allyl group, an aryl group, or a substituted derivative thereof.

16. A supported catalyst according to claim 15, wherein the π-bonded anionic ligand group is a cyclopentadienyl group or a derivative thereof.

17. A method for preparing a supported catalyst composition comprising preparing a functionalized catalyst support according to claim 12 and adding to the functionalized catalyst support a Group 3–10 metal complex containing a substituent which reacts with the functionalized catalyst support to thereby form a composition which is catalytically active for the polymerization of olefins.

18. A polymerization process comprising contacting one or more addition polymerizable monomers under gas phase or slurry polymerization conditions with a catalyst composition according to any of claims 14–16.

19. The process according to claim 18, wherein propylene is polymerized to form polypropylene.

20. The process according to claim 18, wherein ethylene is polymerized, optionally with one or more α-olefin monomers and/or α,Ω-dienes, to form an ethylene polymer.

21. A polymerization process comprising contacting one or more addition polymerizable monomers under gas phase or slurry polymerization conditions with a catalyst composition prepared according to claim 17.

22. The process according to claim 21 wherein propylene is polymerized to form polypropylene, preferably isotactic polypropylene.

23. The process according to claim 21, wherein ethylene is polymerized, optionally with one or more a-olefin monomers and/or α,Ω-dienes, to form an ethylene polymer.

* * * * *

UNITED STATES PATENT AND TRADEMARK OFFICE
CERTIFICATE OF CORRECTION

PATENT NO.    : 6,475,945 B1
DATED         : November 5, 2002
INVENTOR(S)   : Carnahan et al.

It is certified that error appears in the above-identified patent and that said Letters Patent is hereby corrected as shown below:

Column 22,
Line 51, please delete "any of the claims 14-16" and insert therefore -- claim 14 --.

Signed and Sealed this

Thirteenth Day of May, 2003

JAMES E. ROGAN
*Director of the United States Patent and Trademark Office*